July 15, 1969    D. L. KESLING    3,455,461
COLLAPSIBLE BICYCLE SUPPORTING RACK
Filed Jan. 30, 1967
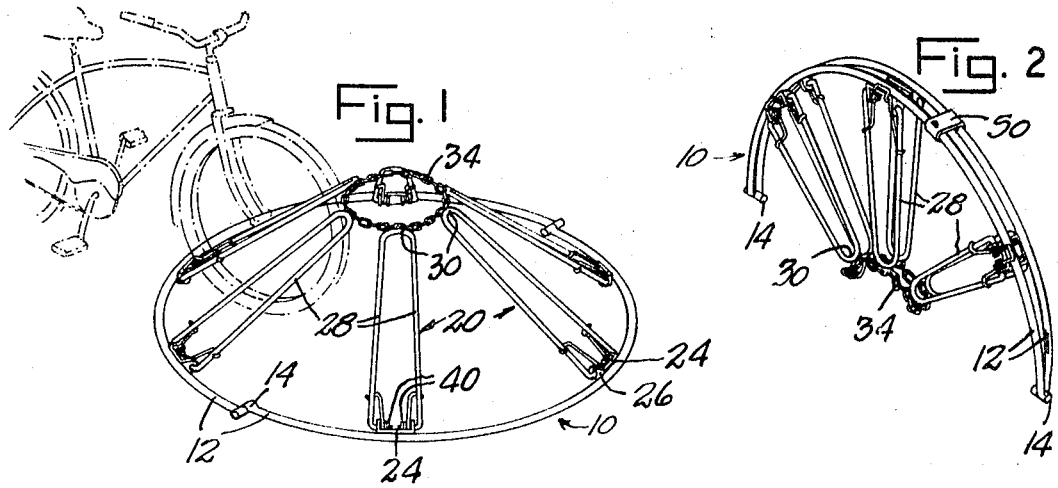
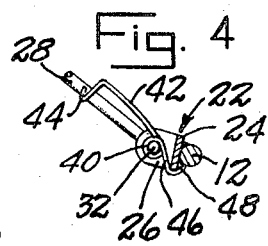
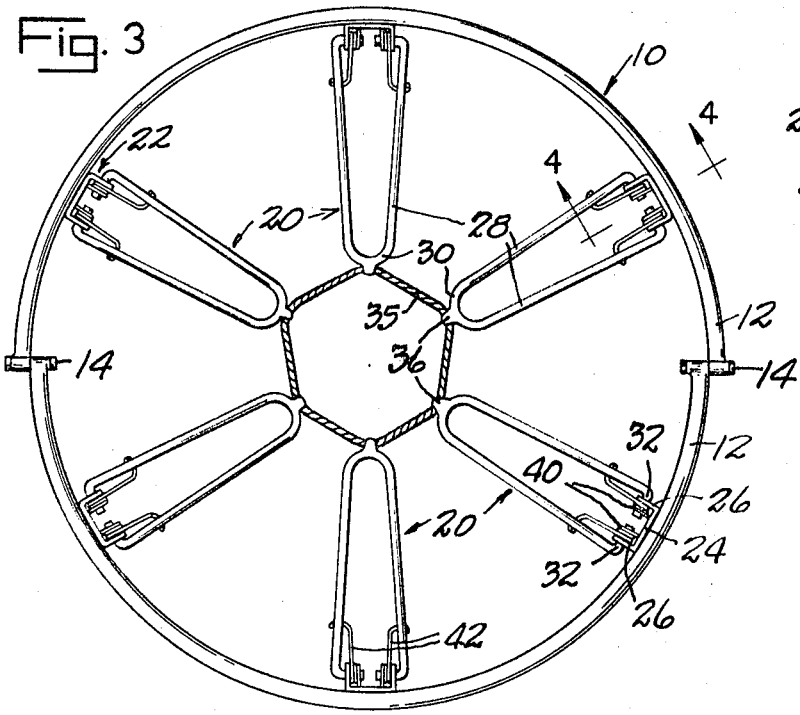
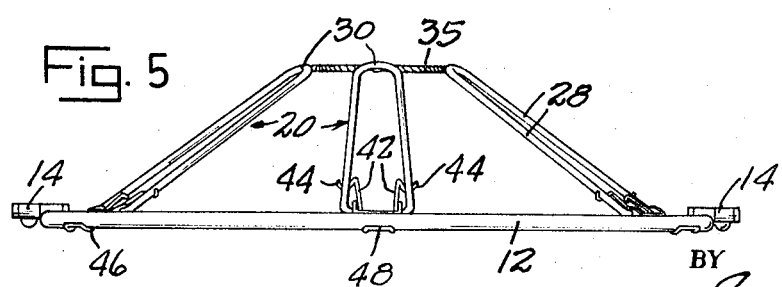
INVENTOR
DAVID L. KESLING
BY
Eugene C. Knoblock
ATTORNEY United States Patent Office 3,455,461
Patented July 15, 1969

3,455,461
COLLAPSIBLE BICYCLE SUPPORTING RACK
David L. Kesling, 3843 Hiawatha Drive,
Michigan City, Ind. 46360
Filed Jan. 30, 1967, Ser. No. 612,420
Int. Cl. A47f 7/00, 5/12
U.S. Cl. 211—21                          6 Claims

ABSTRACT OF THE DISCLOSURE

A collapsible bicycle supporting rack having a multiple part foldable endless frame with a wheel support member pivoted to each frame part and spring urged to an upwardly and inwardly inclined bicycle-wheel-supporting position determined by a flexible member connecting the free ends of the support members; said support members engaging and swinging toward the planes of their mounting frame parts when said frame is folded.

---

This invention relates to improvements in collapsible bicycle supporting racks.

Bicycle supporting racks have commonly been provided heretofore as a fixed or permanent installation of a rigid character. Some racks have been provided which are portable, but these commonly have had a limited capacity and usually have been provided to support only one or two bicycles. The primary object of the present invention is to provide a rack to accommodate a plurality of bicycles, which is portable and foldable so that it may be quickly and conveniently collapsed for storage, may be handled easily and may be stored in a small space.

A further object is to provide a device of this character having a foldable endless frame pivotally mounting a plurality of spring urged wheel support members normally spaced apart and positioned in an upwardly, inwardly inclined relation, wherein said support members engage and swing to position between the frame parts when the frame is folded.

A further object is to provide a device of this character which is inexpensive in construction, light in weight, strong, and is formed of a minimum number of parts.

Other objects will be apparent from the following specification.

In the drawing:

FIG. 1 is a perspective view of the device in operative position.

FIG. 2 is a perspective view of the device in collapsed position.

FIG. 3 is a top plan view of a modified embodiment of the invention.

FIG. 4 is a fragmentary sectional view taken on line 4—4 of FIG. 3.

FIG. 5 is a side view of the device shown in FIG. 3.

Referring to the drawing wherein like parts bear the same reference numerals in all embodiments, the numeral 10 designates a collapsible or foldable multiple-part frame. The frame is formed of two frame sections 12 of generally U-shape having their adjacent ends pivotally connected at pivots 14 to define an endless frame whose parts may lie in a common plane when extended, so as to bear firmly upon a supporting surface such as a driveway, patio, playground or lawn. The frame parts may be formed of metal or plastic tubular, bar or rod stock, or of molding or castings, and are here shown as being of substantially semi-circular form. It will be understood that the circular form is illustrative and not limiting, so the frame parts may be of any desired configuration and thus form a frame or base of selected shape, such as square, hexagon, or oval. One of the frame parts may be slightly smaller than the other, as best seen in FIG. 3, but any other arrangement which accommodates folding of the top frame parts into a compact unit as seen in FIG. 2 by swinging one of the frame parts substantially 180° from extended position may be used.

Each of the frame parts 12 pivotally mounts one or more wheel support units 20, as by means of pivot brackets 22 carried by said frame part. The pivot brackets may be of the construction best shown in FIGS. 3 and 4 and constitute U-shaped brackets having a base or web portion 24 secured to a frame part 12 and a pair of spaced legs or flanges 26. The pivot brackets 22 may be integral with or fixedly secured to the frame sections 12 in any suitable manner as by welding, soldering, riveting or bolting thereof, and extend inwardly from the frame toward the center of the frame preferably at an inclined position relative to the frame part as seen in FIG. 4. Each of the wheel support units 20 is preferably of U-shape and may be formed of wire, rod or tube stock. Each wheel unit 20 has a pair of spaced support runs or arms 28 connected by a return bent or bight portion 30. The free ends of the support runs or arms 28 are pivotally connected to the legs 26 of the bracket in any suitable manner. As here illustrated, the free ends of the arms 28 are bent at 32 into substantially axial alignment, and pass through aligned apertures in the bracket legs 26. The return bent or bight portions 30 of the wheel support units 20 are connected by flexible means, such as chain 34 shown in FIGS. 1 and 2, or a flexible cable 35 as seen in FIGS. 3 and 5. The connecting members 34 and 35 are preferably endless, and are secured in place upon the support ends 30 by welding or soldering thereof, by rivets or bolts, or by brazing, or by passing through apertured projections 36 on the supports, as seen in FIG. 3.

Each wheel support unit 20 has spring means normally urging the same into an upwardly, inwardly inclined or angularly extending position relative to the plane of the frame by which it is mounted, as best seen in FIGS. 1 and 5. The spring means preferably constitute a spring wire anchored to the pivot and bearing against the frame and against arms 28 of the wheel support units. In the form here illustrated, the spring means constitute a spring wire member having a pair of axially aligned loops 40 which preferably encircle the pivot ends 32 of the wheel support units. Each of the two spring wire loops 40 has projecting therefrom an elongated arm 42 which terminates in a hook portion 44 which engages the adjacent support arm 28. Runs or portions 46 of the spring extend outwardly from the loops 40 thereof and downwardly to extend under the bracket web or base portion 24 and under the adjacent frame part 12, as seen in FIGS. 4 and 5. The runs 46 are interconnected by cross parts 48, as best seen in FIG. 5.

The wheel support units 20 are preferably arranged symmetrically and substantially equally spaced circumferentially around the frame, as best seen in FIG. 3. When the frame is extended to operative position, as illustrated in FIGS. 1, 3 and 5, the springs 40–48 act upon the wheel support units 20 to urge them toward an inclined position extending upwardly and inwardly from the frame. The flexible connector 34 or 35 which interconnects the inner ends of the wheel support units 20 serves to limit the spacing between said units and thereby to limit the angle at which the units may be urged upwardly by means of the springs. In view of the angular disposition of the pivot axes 32 of the adjacent wheel support units relative to one another and substantially in the same plane, this combination and arrangement of parts in which the springs 40, 48 tilt the wheel supports 20 and the flexible members 34 and 35 limit the tilted position of the supports 20 insures that the device in all normal conditions will be adapted for the support of a wheel of a bicycle at each of the wheel support units by passing the wheel between the runs or arms 28 of a support 20 as seen in FIG. 1. In this connection, it will be apparent that the spacing between the runs or arms 28 will preferably be such as to accommodate a bicycle wheel therebetween with slight clearance. The wheel enters the wheel support unit by running over the frame member 12 and the web portion 24 of the pivot bracket 22, which serve as means to prevent withdrawal of the wheel accidentally from the device. The length of each support unit 20 is preferably such that the spacing between the frame 12 and the bracket web portion 24 at one end and the return bent or bight portion 30 of the other end will permit a bicycle wheel to rest upon the surface upon which the device is supported when in normal operative position with a tire adjacent to the bight portion and also bearing upon or adjacent to the bracket web 24. The bicycle can easily be manipulated to cause the wheel to enter this position and to retain this position normally, and to withdraw the wheel from this supported position by simply pulling on the bicycle to cause the wheel to travel out of the support unit 20 by running over the frame unit 10, 22.

The device can be folded about its pivot axes 14 to the collapsed position illustrated in FIG. 2 by a simple manual manipulation in which one or both of the frame parts are swung upwardly to the FIG. 2 position. During this operation of swinging the parts to the FIG. 2 position, the free or inner ends of the wheel support units 20 engage each other and are swung toward the planes of the frame members upon which they are mounted against the actions of the springs 40, 48. This action serves to decrease the spacing between the free ends of adjacent supports 20, which action is accommodated by the flexible character of the connector 34 or 35. Thus, in the collapsed position, the members 20 tend to position themselves by the contact of the free ends thereof and by the action of the springs bearing thereon.

A releasable clamp or clip 50 may be applied to the folded frame parts 12, preferably substantially centrally thereof relative to the pivot axes 14 as illustrated in FIG. 2, and serves to hold the device in its folded or collapsed position. The device can readily and conveniently be carried while in this collapsed position and can be stored in a comparatively small space. Thus, one manner of support or storage of the collapsed device is to hang the same upon a hook upon the wall of a garage or other storage space, in which position it lies flat against the wall and consumes very little space, and yet is readily accessible and easily applied and removed.

While the preferred embodiments of the invention have been illustrated and described, it will be understood that changes in the construction may be made within the scope of the appended claims without departing from the spirit of the invention.

I claim:
1. A collapsible bicycle supporting rack comprising
 (a) a multiple part foldable endless frame,
 (b) an elongated member pivoted at one end thereof to each frame part to swing to and from upwardly and inwardly inclined relation to a horizontally positioned frame part, each member including spaced parts adapted to position a bicycle wheel therebetween.
 (c) spring means urging each member to upwardly inwardly inclined position relative to its mounting frame part, and
 (d) flexible means connecting the free ends of said members to limit angular tilting thereof by said spring means, said flexible means accommodating swinging of said members toward the planes of said frame parts when said frame is folded to a collapsed position.

2. A collapsible bicycle supporting rack as defined in claim 1, wherein
 said frame constitutes two parts and each frame part mounts a plurality of said members and the members mounted on each frame part are pivoted thereto on angularly displaced axes in substantially the same plane.

3. A collapsible bicycle supporting rack as defined in claim 1, wherein
 each spring means constitutes an elongated spring member anchored adjacent the pivot axis of a member and engaging said member and a frame part in opposed relation to and spaced from said pivot axis.

4. A collapsible bicycle supporting rack as defined in claim 1, wherein
 each frame part carries a bracket projecting inwardly thereof at which a member is pivoted, and
 said spring means includes a pivot-encircling loop portion and opposed spring arms engaging said member and frame spaced from said pivot axis.

5. A collapsible bicycle supporting rack as defined in claim 1, and
 means for releasably anchoring said frame parts in collapsed position.

6. A collapsible bicycle supporting rack as defined in claim 1, wherein
 said flexible means is an endless member.

References Cited

UNITED STATES PATENTS

| 703,280 | 6/1902 | Knoche | 211—20 |
| 7,701,696 | 2/1929 | Parsons | 248—293 XR |
| 2,071,257 | 2/1937 | Hansen | 248—293 XR |

FOREIGN PATENTS

| 993,285 | 7/1951 | France. |
| 16,941 | 1900 | Great Britain. |

CHANCELLOR E. HARRIS, Primary Examiner
R. P. SEITTER, Assistant Examiner

U.S. Cl. X.R.
211—171; 248—293